US008323605B2

(12) United States Patent
Schipper

(10) Patent No.: US 8,323,605 B2
(45) Date of Patent: *Dec. 4, 2012

(54) PROCESS FOR THE MANUFACTURE OF $P_4O_6$

(75) Inventor: Willem Schipper, Middelburg (NL)

(73) Assignee: Straitmark Holding AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,199

(22) Filed: May 27, 2011

(65) Prior Publication Data

US 2011/0280783 A1    Nov. 17, 2011

Related U.S. Application Data

(63) Continuation of application No. 12/599,870, filed on Jan. 27, 2010, now Pat. No. 7,976,811.

(30) Foreign Application Priority Data

Nov. 28, 2007 (EP) ...................................... 07121760
Nov. 28, 2008 (EP) ................... PCT/EP2008/066396

(51) Int. Cl.
*C01B 25/12* (2006.01)
(52) U.S. Cl. ........................................................ 423/304
(58) Field of Classification Search .................... 423/304
See application file for complete search history.

(56) References Cited

U.S. PATENT DOCUMENTS

| 3,532,461 | A | * | 10/1970 | Whyte et al. ................... 423/304 |
| 3,652,211 | A | | 3/1972 | Mezey et al. |
| 3,652,213 | A | | 3/1972 | Krause et al. |
| 7,976,811 | B2 | * | 7/2011 | Schipper ........................ 423/304 |

FOREIGN PATENT DOCUMENTS

| DE | 1172241 B1 | 6/1964 |
| DE | 116457 A1 | 11/1975 |
| DE | 216465 A1 | 12/1984 |
| DE | 216516 A1 | 12/1984 |
| DE | 292213 A5 | 7/1991 |
| DE | 292637 A5 | 8/1991 |

OTHER PUBLICATIONS

Miller, Christina C. "The slow oxidation of phosphorus. II The oxidation nproducts of phosphorus and phosphorous oxide", Journal of the Chemical Society (1929), 1829-46.

* cited by examiner

*Primary Examiner* — Wayne Langel
(74) *Attorney, Agent, or Firm* — Husch Blackwell LLP

(57) ABSTRACT

The invention relates to a process for the production of $P_4O_6$ of high purity by reacting oxygen, or a mixture of oxygen and an inert gas, with gaseous or liquid phosphorus to generate said reaction product in a reaction unit. The reaction product is kept in the reaction unit at an average temperature in the range of 1600 and 2000 K by removing the heat created by the exothermic reaction of phosphorus and oxygen. A residence time of at least 1 second of the reaction product passing the reaction unit is maintained. The reaction product is then conventionally cooled in a quenching unit connected with the reaction unit. The final reaction product contains $P_4O_6$ with a very low content of elemental phosphorus.

10 Claims, No Drawings

PROCESS FOR THE MANUFACTURE OF $P_4O_6$

CROSS REFERENCE TO RELATED APPLICATIONS

This application is a U.S. Continuation Application of U.S. application Ser. No. 12/599,870, filed on Jan. 27, 2010, which claims the benefit of priority from International Application No. PCT/EP2008/066396 filed Nov. 28, 2008, which claims the benefit of priority from European Patent Application No. 07121760.8 filed on Nov. 28, 2007. The disclosures of U.S. application Ser. No. 12/599,870, International Application PCT Application No. PCT/EP2008/066396, and European Patent Application No. 07121760.8 are incorporated herein by reference.

The invention relates to a process for the manufacture of phosphorus(III)oxide with the empirical formula $P_4O_6$, made by the reaction of phosphorus and oxygen wherein the obtained reaction product is in essentially pure form, and, further, to a product containing $P_4O_6$ of high purity which may be manufactured by this process and is suitable as a basic material which term shall include its use as a starting material, raw material and intermediate, in the manufacture of organic phosphorus(III) compounds, an industrially important class of chemicals. The term "$P_4O_6$" as used herein is intended to encompass all formulas conventionally used for phosphorus (III)oxides like $P_2O_3$ (phosphorus trioxide).

$P_4O_6$ has not previously been prepared on a commercial scale, and although already proposed it has not been commercially used, for example as a basic material for the manufacture of organic phosphorus(III) compounds. Instead of using $P_4O_6$ as a raw material, such chemicals are usually made starting from phosphorus trichloride ($PCl_3$). However, the application of $PCl_3$ has several disadvantages. It requires the use of a large amount of chlorine to react with white phosphorus. $PCl_3$ contains only 22.7 weight percent of phosphorus, and, moreover, intermediates and end products to be made from $PCl_3$, usually do not contain chloride. Consequently chlorine is released in the form of considerable amounts of undesired byproducts, including often hydrochloric acid, to be separated in complex and expensive process steps. Local circumstances may allow sale as low-value byproduct, but disposal is necessary in many cases.

Alternatively to $PCl_3$, phosphorous acid, $H_3PO_3$, can be used as the basic material in a number of production processes, thus avoiding part of the adverse effects associated with $PCl_3$. However, $H_3PO_3$ is also made commercially from $PCl_3$, by hydrolysis, which implies that the disadvantages associated with the presence of chlorine will still appear, only at a different stage in the production chain. Moreover, $H_3PO_3$ has the drawback to show a markedly different reactivity compared to $PCl_3$.

The use of its corresponding anhydride, $P_4O_6$, would not show said disadvantages which would allow using it as such basic material in a broader range of chemistry. Further, its phosphorus content is markedly higher than that of $PCl_3$ or $H_3PO_3$, making it the most concentrated source of trivalent phosphorus, and thus it would be the more valuable and suitable basic material in chemical synthesis.

The process to manufacture $P_4O_6$ is commonly carried out by direct reaction of white phosphorus and oxygen in stoichiometric quantities. The reaction mixture is generated in a flame which without cooling can reach temperatures up to 6000 K. It is known that $P_4O_6$ is unstable and decomposes at temperatures above 700 K, forming unwanted oxides of phosphorus (mixed P(III/V)oxides and phosphorus suboxides) and elemental phosphorus. Therefore, many proposals were made how to quench and cool the obtained reaction mixture immediately and effectively, to avoid decomposition and to obtain a product of high yield and purity.

The process for manufacturing $P_4O_6$ as described in DD 216516 A1 comprises steps of combining the reactants, evaporated phosphorus and an oxygen-inert gas mixture, in a mixing nozzle. The reaction occurs in a reactor generating a mixture of phosphorus oxides at a temperature between 2000 and 6000 K depending on the quantity of inert gas used. The reaction mixture passes the reactor after a very short residence time not exceeding 0.005 seconds. The reaction mixture is rapidly cooled from that temperature range below 300 K in three steps avoiding decomposition of the reaction mixture. In a first cooling step the reaction product is rapidly cooled from that temperature range to a temperature between 1600-1200 K by applying indirect cooling. That first cooling step is carried out in a reactor at a rate of $0.1*10^6$ to $10*10^6$ $Ks^{-1}$. After leaving the reactor the reaction mixture is further rapidly cooled in a second cooling step immediately following the first cooling step. Hereby the same high cooling rate as used in the first cooling step is employed, but this time by adding large quantities of inert gas to the reaction mixture, to a temperature of about 700 K. Finally in a third cooling step the reaction mixture is cooled and condensed to below 300 K, for instance by adding liquid $P_4O_6$ or liquid reaction mixture. The reaction mixture is then purified, for example by distillation.

The process for manufacturing $P_4O_6$ as proposed by DD 292213 A5 uses the same principle as mentioned in DD 216516 A1, reacting gaseous phosphorus and oxygen in a reactor, but uses modified cooling steps. First, indirect cooling decreases the temperature of the gaseous reaction mixture to 1000-750 K. In the second cooling step the reaction product is condensed by adding liquid $P_4O_6$ or liquid reaction mixture as coolant.

Also DD 292637 A5 discloses a process for manufacturing $P_4O_6$ by reacting phosphorus and oxygen in a mixture with nitrogen in a tubular reaction chamber. The reaction product obtained by this process has a lower content of unwanted oxides of phosphorus. This is achieved by using a specifically designed tubular segment aimed at mixing the gas stream. This segment is placed between the tubular reaction chamber and a quenching unit. The inner cross section of the tubular segment is smaller than the inner cross section of the tubular reaction chamber. The reaction product leaving the reaction chamber with a temperature between 2200 and 1600 K is fed into the tubular segment. Due to that specific design of the tubular segment the temperature of the reaction product distributed over the cross section of the tubular segment becomes more homogeneous before it enters the quenching unit.

The processes for manufacturing $P_4O_6$ of the prior art do not lead to a product suitable as a basic material for commercially manufacturing organic phosphorus(III) compounds, because $P_4O_6$ is not obtained in sufficient quality, in view of its high content of elemental phosphorus ($P_4$) dissolved in $P_4O_6$. $P_4O_6$ is a liquid at room temperature, and when made according to the known processes it contains elemental phosphorus up to the maximum solubility of that byproduct. Such content of elemental phosphorus generally corresponds to its maximum degree of saturation and may be up to 10 percent (DD 116457 A1; DD 216465 A1). DE 1 172 241 B discloses a process for manufacturing $P_4O_6$ with a phosphorus content between 1 and 10% with a very low, inadequate yield. Especially phosphorus is an impurity very difficult to remove by distillation because its boiling point and vapour pressure are relatively close to those of $P_4O_6$. Whereas the processes for manufacturing $P_4O_6$ of the prior art propose various methods to obtain phosphorus oxide of the desired +3 oxidation state with limited formation of oxides with different oxidation states, a method to reduce the content of elemental phosphorus in the reaction product has not been disclosed.

Accordingly elemental phosphorus necessarily remains in the $P_4O_6$ when it is used as a basic material in derivative chemistry. This is of great disadvantage especially when reactions in watery or otherwise polar media are carried out. This leads to the formation of a phosphorus emulsion or suspension, because $P_4$ is not soluble in polar media. The appearance of such an emulsion or suspension poses an important separation challenge, as $P_4$ is toxic and pyrophoric and thus requires extensive investments to ensure its safe and reliable removal and disposal. The presence of elemental phosphorus seriously reduces the potential of economical applications of $P_4O_6$ when used as the basic material.

It is therefore an object of this invention to create a production process for the manufacture of $P_4O_6$ that avoids these disadvantages. It shall allow the synthesis of $P_4O_6$ in high yield and excellent purity which means $P_4O_6$ obtained by the process according to the invention shall be essentially free of elemental phosphorus and, further, in a preferred embodiment, shall be essentially free of unwanted oxidation products of phosphorus wherein the phosphorus atom has an oxidation state lower or higher than +3, providing a product showing excellent properties when used as a basic material in further chemical reactions, especially when used for the manufacture of organic phosphorus(III) compounds.

This object is achieved by a process for the production of a reaction product consisting essentially of $P_4O_6$ by reacting oxygen, or a mixture of oxygen and an inert gas, with gaseous or liquid phosphorus in essentially stoichiometric amounts to generate the reaction product in a reaction unit, keeping the obtained reaction product in said reaction unit at an average temperature in the range of 1600 and 2000 K by removing the heat created by the exothermic reaction of phosphorus and oxygen, and maintaining a residence time of at least 1 second of the reaction product passing the reaction unit, then forwarding the reaction product to one or more quenching unit(s) where it is quenched to a lower temperature where no essential decomposition of the reaction product occurs. Preferred embodiments of the process are disclosed below.

It is a further object of the invention to provide $P_4O_6$ obtained by reaction of phosphorus and oxygen in high purity and being essentially free of elemental phosphorus and, in a preferred embodiment, also essentially free of other, unwanted phosphorus oxides, thus showing excellent properties when used as a basic material in further chemical reactions, especially when used for the manufacture of organic phosphorus(III) compounds.

This object is achieved by $P_4O_6$ obtainable by the process of the invention and its preferred embodiments, and comprising less than 1.0 weight percent of elemental phosphorus. The product consists of $P_4O_6$, and comprises less than 1.0, preferably 0.5 or less weight percent of elemental phosphorus. It is preferably manufactured by using the process of the invention, especially by the preferred embodiments of this process as described herein, and shows excellent purity which makes it valuable as the basic material in the formation of organic phosphorus(III) compounds. After quenching the reaction product contains already a very low content of elemental phosphorus and contains 85 to 95, preferably 89 to 92 weight percent of $P_4O_6$. Other byproducts than elemental phosphorus which are essentially said unwanted phosphorus oxides can be easily removed by appropriate methods such as distillation. After that purification step the reaction product contains preferably more than 99, particularly at least 99.5 weight percent of $P_4O_6$ based on the total weight, and shows generally a maximum content of elemental phosphorus of less than 1.0, preferably 0.5 or less weight percent. Under optimum conditions of the process as described herein, the content of elemental phosphorus is even about 0.25 or less weight percent. The content of elemental phosphorus is measured by $^{31}P$ NMR.

According to the process of the invention, oxygen or a mixture of oxygen and an inert gas like nitrogen, and gaseous or liquid phosphorus are passed into a reaction unit where they are combined and immediately react with each other in a strong exothermic reaction generating the reaction product. The quantities of both reactants are adjusted to be close to or correspond essentially to the theoretical stoichiometric amounts of $P_4O_6$, which means the molar ratio of phosphorus ($P_4$) to oxygen ($O_2$) should generally be in the range of 1:2.7 and 1:3.3. The reaction unit is cooled by suitable means, preferably by external extraction of heat, to maintain an average temperature of the reaction product within the reaction unit between 1600 and 2000 K, preferably between 1650 and 1850 K.

It is an essential feature of the process of the invention that the reaction product is maintained in said temperature range for a certain residence time in the reaction unit. Surprisingly this procedure seems to be responsible for the fact that the final product contains essentially no or very low amounts of elemental phosphorus. A residence time of about 1 second would already lead to the effect that a reduced content of elemental phosphorus within the final product of less than 1 weight percent is achieved. When a residence time of 1 second or more, for example between 1 and 8 seconds is used, the yield of $P_4O_6$ will reach an optimal value while at the same time the remaining elemental phosphorus is present in a quantity between 1 and 0.5 weight percent or less. By choosing a residence time of more than 8 seconds, preferably up to 30 seconds a content of 0.5 or less, preferably less than 0.25 weight percent of elemental phosphorus will be present in the final product, and the yield of $P_4O_6$ is also very high. The weight percentage values of elemental phosphorus are related to the total weight of the final reaction product after removing unwanted byproducts mainly in form of other phosphorus oxides. A residence time of more than about 40, especially more than 60 seconds does not lead to any essential further improvement with regard to the content of the elemental phosphorus in the final product. In the process a residence time as disclosed herein in combination with the specific average temperature of 1600 to 2000 K is employed at the same time. When using an average temperature within the range of 1650 to 1850 K in combination with a residence time as mentioned above, the resulting reaction product shows a specific low content of elemental phosphorus, and is obtained with high yield and purity.

The residence time expresses how fast the reaction product moves through the volume of the reactor unit and expresses the average time the reaction product spends in the reactor unit. As is generally known the residence time is defined to be the quotient of the reactor volume divided by the volumetric flow rate. This means that the residence time could be adjusted by tuning the volumetric flow rate of the reaction product in relation to the used volume of the reaction unit. The volumetric flow rate is defined as the volume of the reaction product which passes through the reactor unit per unit of time.

The reaction product is then passed from the reaction unit to a quench unit where it is rapidly cooled down, preferably in one step, to temperatures where no essential decomposition of $P_4O_6$ occurs. Generally such temperature is below 700 K.

Such quenching is preferably carried out by adding liquid reaction product already quenched, preferably produced by the same process, and/or adding finally obtained liquid $P_4O_6$ as coolant to the reaction product. Optionally the product is cooled in said quenching step or in a separate cooling step following quenching to temperatures that enable easy handling and/or processing, which may be generally below 350 K.

For further use of the reaction product as a basic material to produce organic phosphorus(III) chemicals, it is advisable to purify the cooled and condensed reaction product for example by distillation to remove unwanted byproducts which comprise mainly oxides of phosphorus of a lower or higher oxidation state than +3. The distilled product contains more than 99 weight per cent of $P_4O_6$.

The arrangement suitable to carry out the process of the invention of manufacturing $P_4O_6$ by the reaction of phosphorus and oxygen comprises a reaction unit where the reactants are combined and reacted with each other in a reaction zone, and it further comprises a quenching unit connected with one or more outlets of said reaction unit. Downstream one or more further quenching unit(s) may be arranged to complete cooling of the reaction product. The volume of the reaction unit is designed to secure the appropriate residence time in relation to the intended volumetric flow of the reaction product. The reaction unit further comprises means for cooling the reaction unit externally and/or internally for removing the energy generated by the reaction process and maintaining the required temperature. The reaction unit may have any appropriate shape such as a cylindrical chamber or vessel or any other suitable form. The reaction unit further comprises means for passing the reactants involved in the process separately or jointly into the reaction zone within the reaction unit which means may have the form of pipes or tubes. When both reactants are combined or get into contact with each other in the reaction zone, they spontaneously react with each other. The reaction can be carried out, for example, by combining the passages of both reactants in the hole of a nozzle. The reaction unit further comprises at least one outlet through which the vaporous reaction product is transferred to the quenching unit. All elements and units are made of suitable material to accomplish the process.

The following Example demonstrates, without limiting the scope of the claimed invention, a preferred embodiment of the process.

EXAMPLE

A stream of 4.05 mole of white phosphorus ($P_4$) per hour is continually fed into an evaporator and evaporated at 770 K at atmospheric pressure. The ensuing stream is fed into the chamber of a reactor of 7800 ml volume. A continuous stream of oxygen gas, 12.3 moles per hour (as $O_2$) is introduced in the same reactor. These reaction parameters correspond to a residence time of 24 seconds in the reactor. The reactor chamber is kept at a temperature of 1750 K by extracting excess reaction heat through the walls of the reaction chamber by means of external, indirect cooling. The reaction product leaving the reactor chamber at its exit is then contacted with a stream of 20 l/h of earlier condensed, liquid reaction product, obtained from previous experiments performed under the same parameters, circulating at 317 K. The reaction product is cooled down to temperatures of the recirculating liquid.

The experiment is halted after 60 minutes.

The reaction product is subjected to a simple distillation to separate it from high-boiling impurities. After condensation, 812 g of freshly formed reaction product is found, which means that this amount does not include the material added as coolant. $^{31}P$ NMR demonstrates that the material is composed of 98.9 weight-% of $P_4O_6$, 0.1 weight-% of $P_4$ and 1.0 weight-% of the mixed higher oxides $P_4O_{7,8,9}$, as well as $P_4O_{10}$. The $P_4O_6$ yield is 90% based on the amount of $P_4$ used which is an excellent value, and the content of elemental phosphorus is extremely low.

The invention claimed is:

1. A process for the production of $P_4O_6$ by reacting oxygen, or a mixture of oxygen and an inert gas, with gaseous or liquid phosphorus in a molar ratio of phosphorus ($P_4$) to oxygen ($O_2$) of 1:2.7 to 1:3.3 to generate the reaction product in a reaction unit, keeping the obtained reaction product in said reaction unit at an average temperature in the range of 1600 and 2000 K by removing the heat created by the exothermic reaction of phosphorus and oxygen, and maintaining a residence time of at least 1 second of the reaction product passing the reaction unit, then forwarding the reaction product to one or more quenching unit(s) where it is quenched to a temperature of below 700 K where no essential decomposition of the reaction product occurs.

2. The process according to claim 1, wherein the reaction product comprises 85 to 95% by weight of $P_4O_6$ and byproducts.

3. The process according to claim 1, wherein the residence time takes between 1 and 60 seconds.

4. The process according to claim 1, wherein the residence time is at least 8 seconds.

5. The process according to claim 1, wherein the residence time is maintained by adjusting the volumetric flow rate of the reaction product which passes the reaction unit to the volume of the reaction unit.

6. The process according to claim 1, wherein the temperature of the reaction product in the reaction unit is maintained at a temperature between 1650 to 1850 K.

7. The process according to claim 1, wherein the reaction product is quenched to a temperature below 350K.

8. The process according to claim 1, wherein the quenching is performed by adding liquid reaction product or liquid P.sub.4O.sub.6 as a coolant to the reaction product to be quenched.

9. The process according to claim 2, wherein the byproducts are unwanted phosphorus oxides that are removed by means of a further step of distillation.

10. The process according to claim 9, wherein the purified reaction product comprises more than 99% by weight of $P_4O_6$.

* * * * *